Patented Oct. 3, 1922.

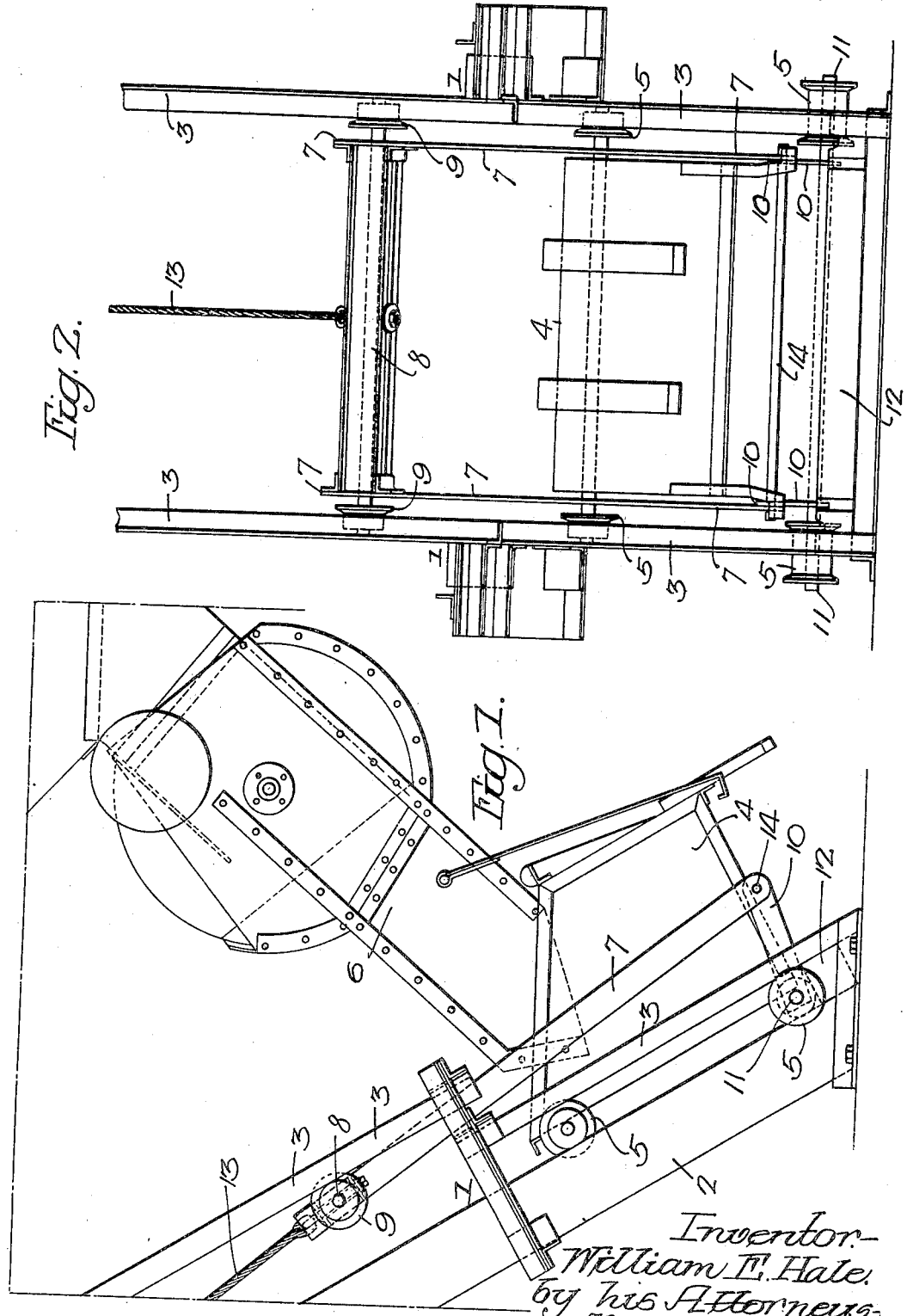

1,430,985

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

BAIL FOR SKIP-HOIST BUCKETS.

Application filed May 16, 1921. Serial No. 469,918.

*To all whom it may concern:*

Be it known that I, WILLIAM E. HALE, a citizen of the United States, residing in Fort Washington, Montgomery County, Pennsylvania, have invented certain Improvements in Bails for Skip-Hoist Buckets, of which the following is a specification.

The object of my invention is to construct the bail of a skip hoist bucket so that the bucket can be stopped at a given point in the event of the slack of the rope not being fully taken up, or if the rope should stretch during the operation of the apparatus.

In the accompanying drawings:

Fig. 1 is a side view of sufficient of a skip hoist to illustrate my invention; and Fig. 2 is a front view illustrating the mechanism shown in Fig. 1.

1 is the frame of the skip hoist. 2 and 3 are the rails. 4 is a bucket having a closed bottom in the present instance. Secured to the bucket are axles on which are wheels 5 adapted to the rails. 6 is a movable chute through which material flows when filling the bucket. This chute is turned on its pivot by the bucket 4. 7 is a bail having a cross bar 8 at the upper end provided with rollers 9 adapted to the rails. The bail is connected to the links 10 by a pivot pin 14, and the links are pivoted to the lower axle 11. 12 is a stop, which limits the downward movement of the bucket. The bail is connected to a rope 13, which is under the control of suitable hoisting mechanism, not shown. In some instances, the length of the hoisting rope may vary, due to stretch, or other conditions, and when the bucket descends and strikes the stop 12, a certain amount of slack will occur in the rope. To avoid this slack, the lower end of the bail is attached to the links, which are pivoted to the bucket near the bottom so that when the bucket strikes the stop the bail will continue its movement until the slack of the rope is taken up, and when it is desired to lift the bucket the first movement is to raise the bail so that its pivot pin 14 will come against the under side of the bucket, after which the bucket will be raised as in an ordinary device of this character.

I claim:

1. The combination in a skip hoist, of rails; a hoisting rope; a closed bottom bucket adapted to travel on said rails; means for limiting the downward movement of the bucket; a bail attached to the rope and loosely connected to the lower end of the bucket so that, when the bucket is lowered and comes to a stop, the bail is free to continue its movement to take up the slack in the rope; and means, on the bail, for engaging the bucket when the bail is raised.

2. The combination in a skip hoist, of rails; a bucket adapted to the rails; a bail; a hoisting rope attached to the bail; and links connecting the bail to the bucket, the pivot connecting the links to the bail bearing against the under side of the bucket, when the bucket is raised.

3. The combination in a skip hoist, of a bucket; guide rails for the bucket; axles on the bucket; wheels on the axles adapted to the rails; a bail extending on each side of the bucket; a hoisting rope connected to the upper end of the bail; and a link at each side of the bucket connecting the bail to the lower axle, the pivot pin, coupling the links to the bail, extending under the bucket from one link to the other.

WILLIAM E. HALE.